Graves & Bogert,
Sawing Shingles.

Nº 10,284. Patented Nov. 29, 1853.

UNITED STATES PATENT OFFICE.

ISRAEL GRAVES AND CHAS. A. BOGERT, OF WEST DRESDEN, NEW YORK.

SHINGLE-MACHINE.

Specification of Letters Patent No. 10,284, dated November 29, 1853.

*To all whom it may concern:*

Be it known that we, ISRAEL GRAVES and CHARLES A. BOGERT, of West Dresden, in the county of Yates and State of New York, have invented certain new and useful Improvements in Shingle-Machines; and we do hereby declare that the following is a full, clear, and exact description of the same, reference being had to the accompanying drawings, forming part of this specification.

Figure 4:
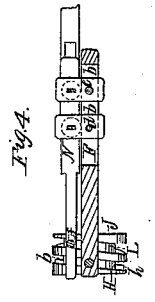
Figure 3:
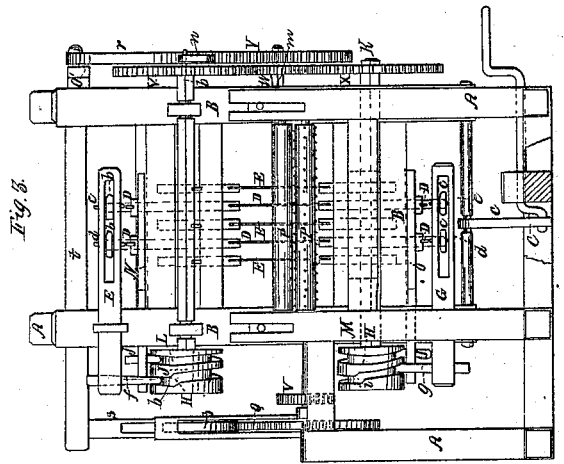
Figure 1:
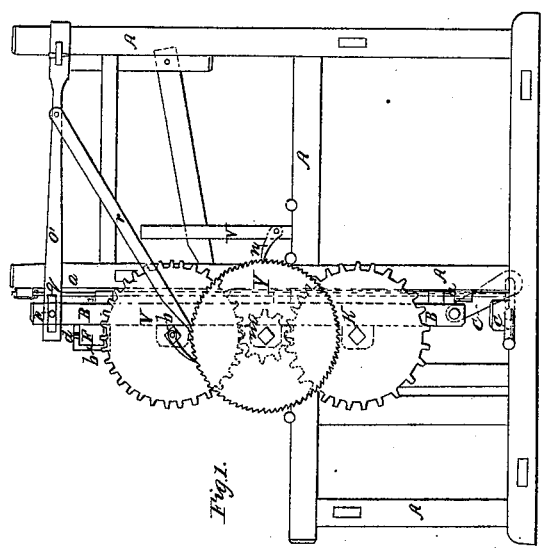
Figure 2:
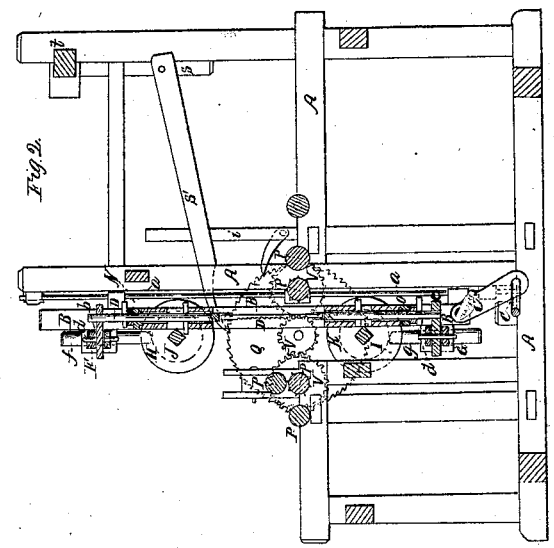

Figure 1, is a side elevation of the machine. Fig. 2, is a vertical longitudinal section of the same. Fig. 3, is a front elevation of the machine, and Fig. 4, is a sectional detached top view, showing the construction and arrangement of the sliding cross pieces which in connection with the cams, which are also shown, give the lateral and other necessary movement to the saw.

Similar letters of reference in each of the several figures indicate corresponding parts.

This invention relates to a new and useful manner of making shingles, whereby we are enabled to produce a series of shingles at every operation of the machine and that too in the most perfect manner and in the same time that it now requires to produce one shingle in a similar state—and Our invention consists in the employment of a gang of stationary and movable vertical saws hung in an ordinary saw gate and so arranged in connection with cams or their equivalents that the movable saws will be caused, as the gate moves up and down, to have a gradual lateral movement from and toward the stationary saws as the stuff is fed in and also at the same time a movement out of a parallel line with the direction of feed communicated to them and they consequently caused to cut in an inclined direction, or line, instead of in a direct line, and thereby give the proper shape and taper to the shingle from tip to butt as will be hereinafter described. The said saw gate being operated vertically by a crank and the cams by means of gearing which is attached fast to the saw gate and moves up and down with it, and the feed rollers being actuated by gearing arranged on the stationary part of the frame.

To enable others skilled in the art to make and use my invention I will proceed to describe its construction and operation.

A, A, represent the frame of the machine which may be made after the plan shown or any more suitable.

B, B, is the saw gate which is moved vertically up and down in the ordinary manner of saw mill gates, by means of a crank C, and is situate near the center of the frame A, as seen in Fig. 2, it sliding up and down on the guide rods $a$, $a$.

D, D, are the movable saws, and E, E, E, the stationary saws, all being hung in the gate B; those D, it will be seen extend up and down some distance farther than those E; the object of this is that they may be secured in the pieces $b$, $b$, and $c$, $c$, which connect them to the slotted cross pieces or arms F, G, one at the top and the other at the bottom of the saw gate; the pieces $b$ $b$ and $c$, $c$, are united to the cross arms F G, by the pins $d$, $e$, which serve as fulcra for them to turn upon. By securing the movable saws fast in the pieces $b$, $b$, and $c$, $c$, it will be seen that, as the pintles $f$, $g$, which are on the ends of the cross pieces F, G, play around in the grooves H, I, of the cams J, K, the movable saws will have a slight movement out of a parallel line with the motion of feed and consequently will cut the butt or stuff tapering or to the shape of shingles, the pieces $b$, $b$, and $c$, $c$, operating like cranks; they turning on the fulcra $d$, $e$, as they are actuated by the cams through the cross pieces or arms F, G, which slide laterally back and forth simultaneously with the lateral movement of the saws. The grooves H, I, cut around in the periphery of the cams are of the same form as the desired shingle, the notches $h$, $i$, in the grooves serving to change the direction of the movement of the saws and to turn out the tip and butt simultaneous with the change effected in the lateral movement of the saws by the grooves L, M, in the cams J, K. The said grooves L, M, being somewhat different in shape from those H, I, they serving to cause the saws to recede from and return toward the stationary saws gradually, so as to give the gradual taper to the shingle while those H, I, serve to give the change of motion and to move the cutting edges of the saws slightly and gradually out of a parallel line with the direction of feed. The movable saws are secured in the sliding cross pieces or arms N, O; one near the top and the other near the bottom of the saw gate as seen in Figs. 2, 3, and 4; each of these cross pieces have a pintle $j$, secured in their outer ends which plays in the grooves L, M, cut in the periphery of the cams J, K, as seen in Figs. 2, 3, and 4. Thus it will be seen that the movable saws are secured in two sliding cross pieces at top and bottom—to wit: in those F, G, which give the saws change in motion and a slight turn from a parallel line with the feed, thereby causing them to cut easy and to give the proper butt and tip to the shingle and in those N, O, which are made to slide laterally back and forth by the grooves L, M, and to give the saws a gradual lateral movement simultaneous with the movements given them by the grooves H, I, and their vertical action and with the feed motion to them, and to cause them to cut the stuff tapering. This arrangement of saws with their motions enable us to produce any desired number of shingles at every operation of the machine and in a very perfect manner, for it will be evident that the saws may be of any number and attached to the sliding cross pieces which connect them with the cams.

P, P' are feed rollers for carrying the stuff up to the saws. The top roller P', may be controlled by springs so as to be susceptible of yielding for different thicknesses of stuff and the lower roller P, may have its periphery set with sharp points to facilitate feed. These feed rollers are set in motion by the gearing Q, V, Figs. 2, and 3, or by any other more suitable.

V W and X, represent two cog wheels and a small pinion between them, they being secured on the shafts $k$, $l$, which have their bearing in the saw gate and move up and down with it, and which carry the cams J, K; the latter being secured on an independent shaft $m$, which has its bearing in the saw gate.

V is a ratchet wheel secured on the pinion shafts $m$. This ratchet wheel has a small pawl $n$, playing in it, the said pawl being hung or made to swing on the end of the shaft $l$, and serving to aid in actuating the ratchet. There is another large pawl lever $r$, playing in this ratchet, it being attached to the slotted arm $o'$, secured on the side and near the top of the machine—this arm $o'$, is secured by means of a pin $p$, to the saw gate, the said pin playing in a slot $q$, in said arm, the slot allowing the arm to adjust itself to the up and down movement of the saw gate. The large lever $r$, is caused to operate the ratchet and through it the cog wheels and cams by the upward movement of the saw gate, for as the gate is raised, the distance between the fulcrum upon which the pawl lever turns and the cog or tooth against which its end fits becomes shortened and consequently pressure is exerted on the ratchet and it caused to turn the distance of a tooth. Simultaneous with this movement of the ratchet and the cams the feed gearing is actuated by another pawl lever $s'$, jointed to the vertical arm $s$, of the cross piece $t$, which is connected to the arm $o'$, and set in motion by it as the saw gate rises and falls. This arrangement of gearing is very effectual in its operation and answers the purpose very well; but other more suitable may be adopted if thought best. By altering the cam and grooves, other figures, such as chair backs and fellies may be sawed out; the operation and direction of the saws being regulated by the cams, as above described.

What we claim as our invention and desire to secure by Letters Patent, is:—

A machine for sawing shingles, and which may be adapted to sawing other irregular shapes, constructed with a gang of stationary and movable saws, arranged vertically in a saw gate which moves up and down; the movable saws of said gang being caused to have a gradually lateral movement, from and toward the stationary saws, while cutting, by means of grooved cams L, M, which operate upon the pintle, $j$, of the sliding bars, N, O, carrying the movable saws, and thereby communicate said lateral movement to them, the said saws, at the same time having a movement slightly out of a parallel line with the direction of feed communicated to them by other cams, H, I, which operate upon the pintle of the sliding bars, F, G, the said movements causing the stuff to be cut tapering, or of required form, substantially as herein described.

ISRAEL GRAVES.
CHAS. A. BOGERT.

Witnesses:
JOHN VEUZIE,
I. D. CONDIT,
A. H. CONDIT.